United States Patent
Chen

(10) Patent No.: US 9,169,978 B1
(45) Date of Patent: Oct. 27, 2015

(54) INTELLIGENT LIGHT EMITTING DIODE LAMP TUBE COMPATIBLE TO T5/T8 ELECTRONIC BALLAST

(71) Applicant: WELETREND SEMICONDUCTOR, INC., Hsin-Chu (TW)

(72) Inventor: Yu-Yen Chen, Hsin-Chu (TW)

(73) Assignee: WELETREND SEMICONDUCTOR, INC., Hsin-Chu (TW)

( * ) Notice: Subject to any disclaimer, the term of this patent is extended or adjusted under 35 U.S.C. 154(b) by 0 days.

(21) Appl. No.: 14/447,851

(22) Filed: Jul. 31, 2014

(51) Int. Cl.
| | |
|---|---|
| *H05B 41/36* | (2006.01) |
| *F21K 99/00* | (2010.01) |
| *F21S 4/00* | (2006.01) |
| *H05B 33/08* | (2006.01) |
| *F21Y 101/02* | (2006.01) |
| *F21Y 103/00* | (2006.01) |

(52) U.S. Cl.
CPC . *F21K 9/17* (2013.01); *F21S 4/008* (2013.01); *H05B 33/0815* (2013.01); *H05B 33/0842* (2013.01); *F21Y 2101/02* (2013.01); *F21Y 2103/003* (2013.01)

(58) Field of Classification Search
USPC ........... 315/86–91, 93, 119, 127, 200 R, 291, 315/294, 295, 297, 307, 362
See application file for complete search history.

(56) References Cited

U.S. PATENT DOCUMENTS 8,476,836 B2 * 7/2013 van de Ven et al. ........... 315/193

\* cited by examiner

*Primary Examiner* — Douglas W Owens
*Assistant Examiner* — Jianzi Chen
(74) *Attorney, Agent, or Firm* — Ming Chow; Sinorica, LLC

(57) ABSTRACT

An intelligent light emitting diode lamp tube compatible to a T5/T8 electronic ballast comprises a tube body, a circuit board provided with at least one LED lamp string to be disposed in the tube body, an integrated circuit disposed on the circuit board, a selection circuit comprising a first conduction loop and a second conduction loop configured with an inductor, and a switch member connected to the integrated circuit. When the intelligent light emitting diode lamp tube is connected to a self-oscillating electronic ballast or an IC-controlled electronic ballast, the internal arithmetic of the integrated circuit can be utilized to conduct the selection circuit and the switch member to change resonance frequency of electrical circuit, so that effects of low power consumption, high adaptiveness and energy conservation can be attained.

6 Claims, 11 Drawing Sheets

INTELLIGENT LIGHT EMITTING DIODE LAMP TUBE COMPATIBLE TO T5/T8 ELECTRONIC BALLAST

BACKGROUND OF THE INVENTION

1. Field of the Invention

The present invention relates to a circuit design of a light emitting diode lamp tube, and in particular refers to a light emitting diode lamp tube compatible to a T5/T8 electronic ballast and capable of completely activating the intelligent LED lamp tube and reducing light-up time, attaining effects of low power consumption, high adaptiveness and energy conservation.

2. Description of the Related Art

Conventionally, T5 or T8 fluorescent lamps are extensively applied to illumination occasions for energy conservation and high power factor. However, with the rapid development of light emitting diode (LED) lamp tube products, T5 or T8 filament heating discharge lamp tubes are gradually replaced. In view of this, a LED lamp tube compatible to a T5/T8 electronic ballast is therefore developed by operators. FIG. 1 is a circuit block diagram of a conventional LED lamp tube compatible to a T5/T8 electronic ballast. In FIG. 1, a lamp holder 1 is disposed with an electronic ballast and a LED lamp tube 3 compatible to the electronic ballast 2, in which the LED lamp tube 3 is activated by the electronic ballast 2.

Generally, the electronic ballast 2 can have two classifications, a self-oscillating electronic ballast and an IC-controlled electronic ballast. When the LED lamp tube 3 is connectively conducted to the IC-controlled electronic ballast, an integrated circuit (IC) adopted by the IC-controlled electronic ballast can be utilized to control a control circuit, capable of providing effects of high power factor, low harmonic distortion, high efficiency. FIG. 2 is an equivalent-circuit diagram of a conventional self-oscillating electronic ballast. In FIG. 2, it can be appreciated that resonance of an inductor/capacitor circuit and properties of inductor transformer applied by the self-oscillating electronic ballast is utilized for circuitry control. When the LED lamp tube 3 is connectively conducted to the self-oscillating electronic ballast, a startup frequency and a working frequency of the self-oscillating electronic ballast are discordant due to large diversities of voltage, electrical current and fluorescent lamp tube, and problems of an output current larger than an lamp tube rating current in the electronic ballast, increased power consumption and energy consumption, rapidly-increased temperature rise are therefore derived, resulting in affecting an lamp string of the LED lamp tube 3 and other electrical component and damage of the LED lamp tube 3 and internal system. It can be appreciated that, variation problems of the electronic ballast 2 cannot be determined during the startup period or usage period in the conventional LED lamp tube compatible to the T5/T8 electronic ballast. Accordingly, the inventor provides a light emitting diode lamp tube compatible to a T5/T8 electronic ballast to improve defects of the conventional LED lamp tube compatible to the T5/T8 electronic ballast.

BRIEF SUMMARY OF THE INVENTION

The purpose of the present invention is to provide a light emitting diode lamp tube which is compatible to a T5/T8 electronic ballast and suitable for a self-oscillating electronic ballast and an IC-controlled electronic ballast, capable of completely activating the intelligent LED lamp tube, reducing light-up time and changing resonance frequency, and attaining effects of low power consumption, high adaptiveness and energy conservation.

To attain the purposes and effects above, the invention provides an intelligent light emitting diode lamp tube compatible to a T5/T8 electronic ballast, comprising a tube body having two electrodes, a circuit board disposed in the tube body to respectively connect to the two electrodes of the tube body and including two prestartup circuits connected to a rectification circuit that is connected to an integrated circuit, and at least one light emitting diode lamp string respectively connected to the rectification circuit and the integrated circuit. A selection circuit provided with a first end that is connected to the light emitting diode lamp string and a second end that is capable of connecting to a switch member having one end connected to the integrated circuit comprises at least one first conduction loop and at least one second conduction loop, in which the first conduction loop is provided with a first end connected to the light emitting diode lamp string and a second end connected to the integrated circuit via the switch member, and the second conduction loop configured with an inductor is provided with a first end connected to the light emitting diode lamp string and a second end connected to the integrated circuit via the switch member.

Further, with the intelligent light emitting diode lamp tube compatible to a T5/T8 electronic ballast of the invention capable of being connected to a self-oscillating electronic ballast or an IC-controlled electronic ballast, the selection circuit and the switch member can be triggered by the integrated circuit, so that the electronic current is allowed to travel the first conduction loop or the second conduction loop configured with an inductor. Accordingly, with the invention capable of completely activating the intelligent LED lamp tube and reducing light-up time and changing resonance frequency, effects of reducing power consumption and energy conservation can be attained, and advantages of applicable to different electronic ballasts and preferred adaptiveness can be achieved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
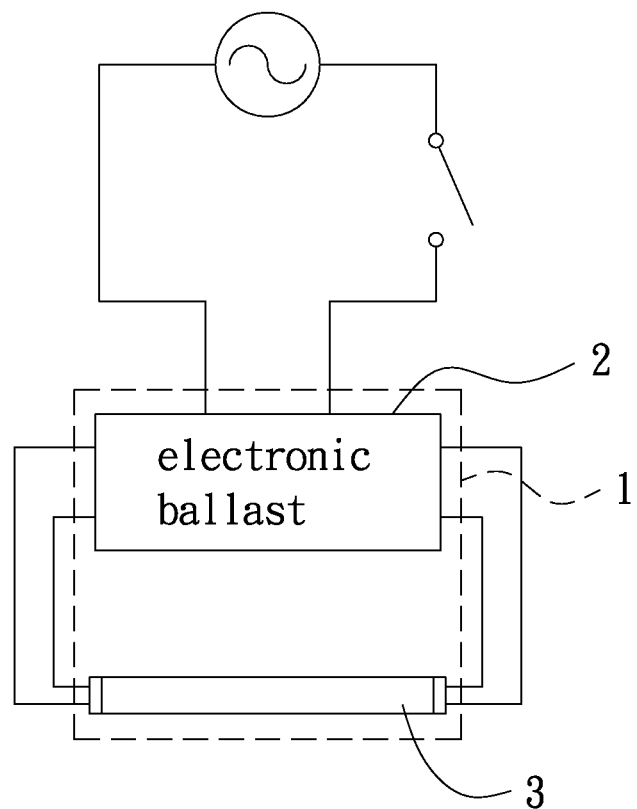
FIG. 1 is a circuit block diagram of a conventional light emitting diode (LED) lamp tube compatible to a T5/T8 electronic ballast.
Figure 2:
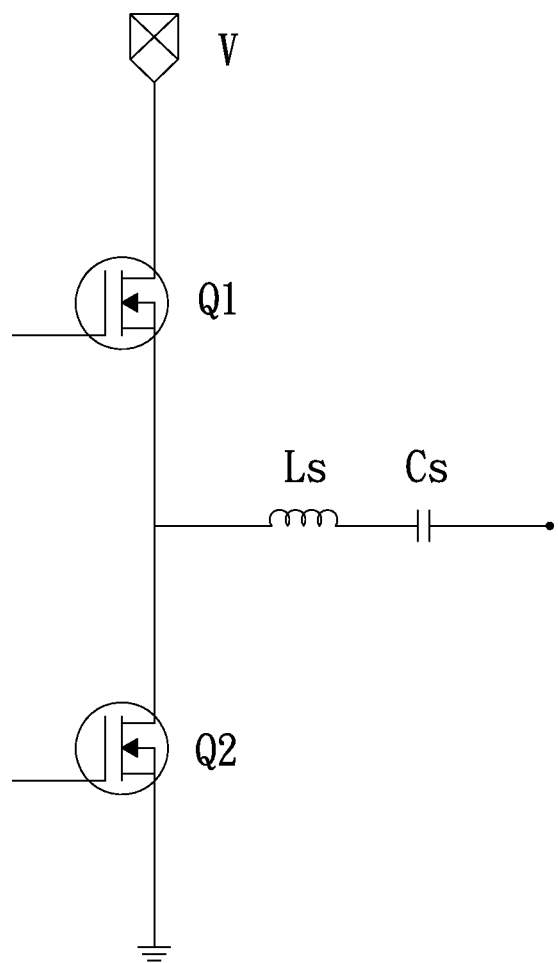
FIG. 2 is an equivalent-circuit diagram of a conventional self-oscillating electronic ballast.
Figure 3:
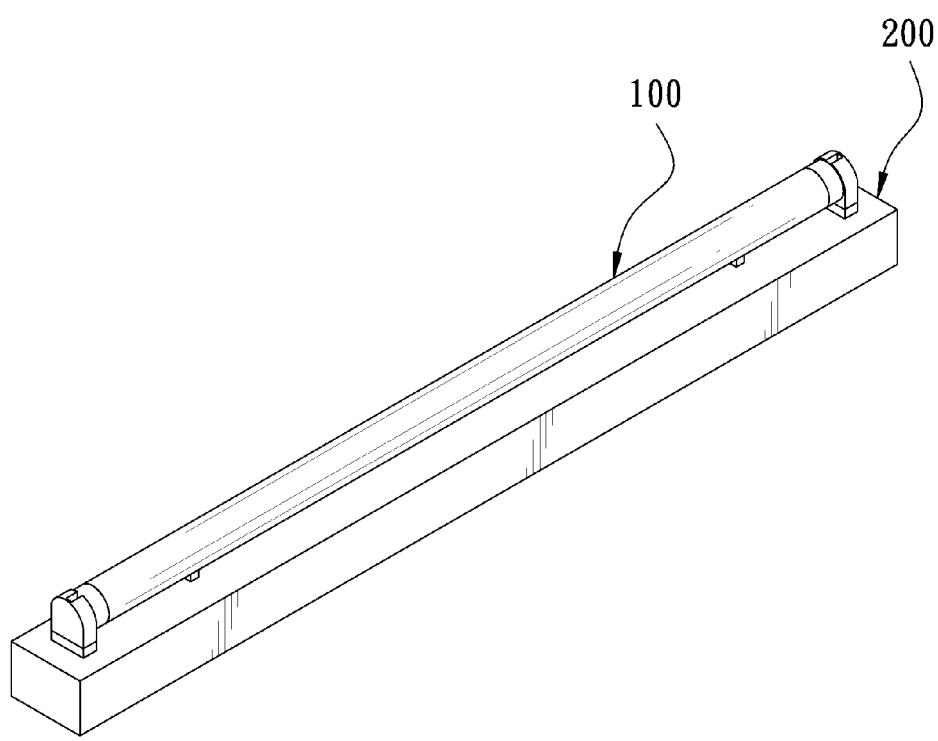
FIG. 3 is an appearance perspective view of a preferred embodiment of the invention pluggingly connected to a T5/T8 lamp holder.
Figure 4:
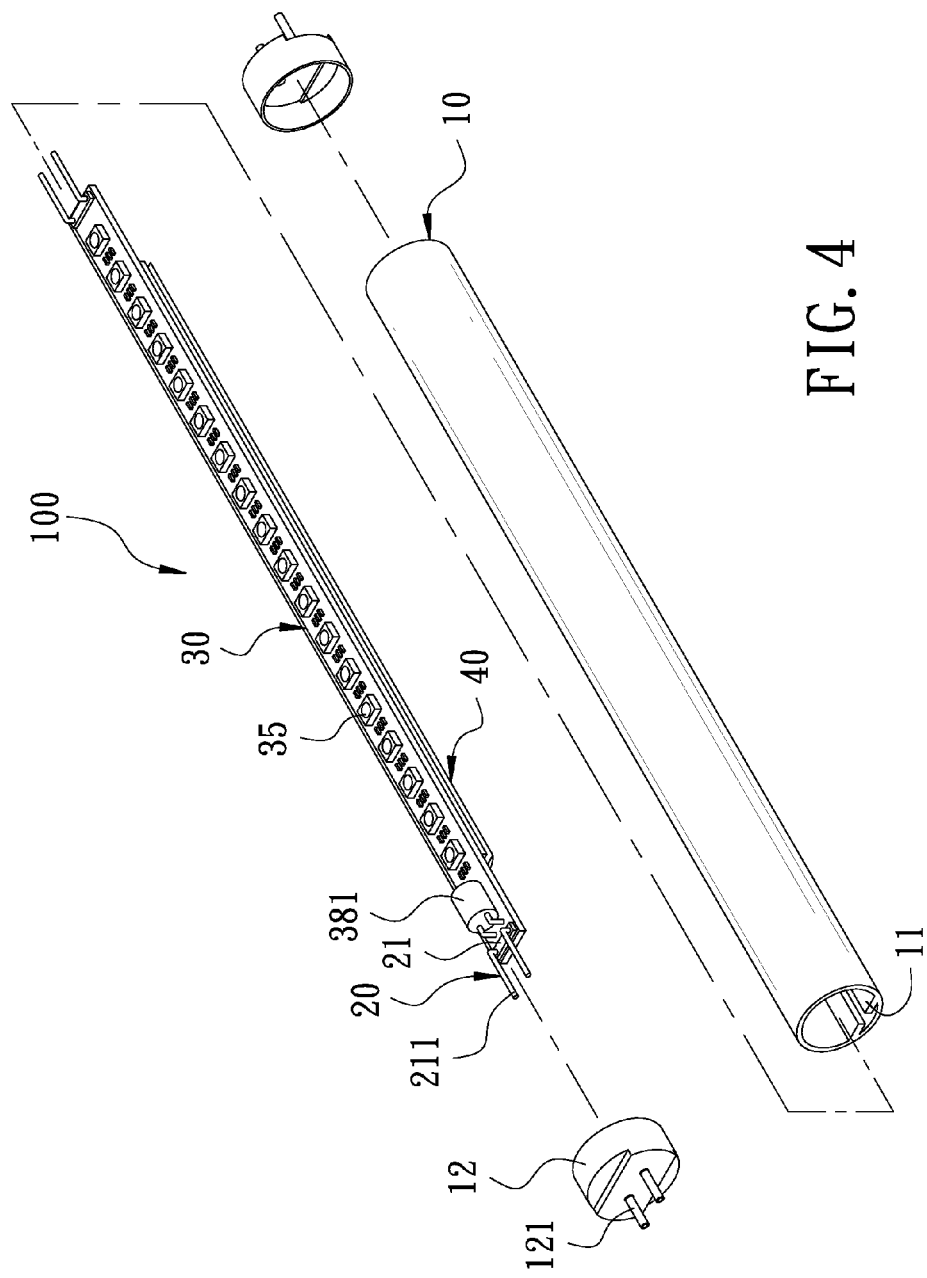
FIG. 4 is an exploded perspective view of a preferred embodiment of the invention.
Figure 5:
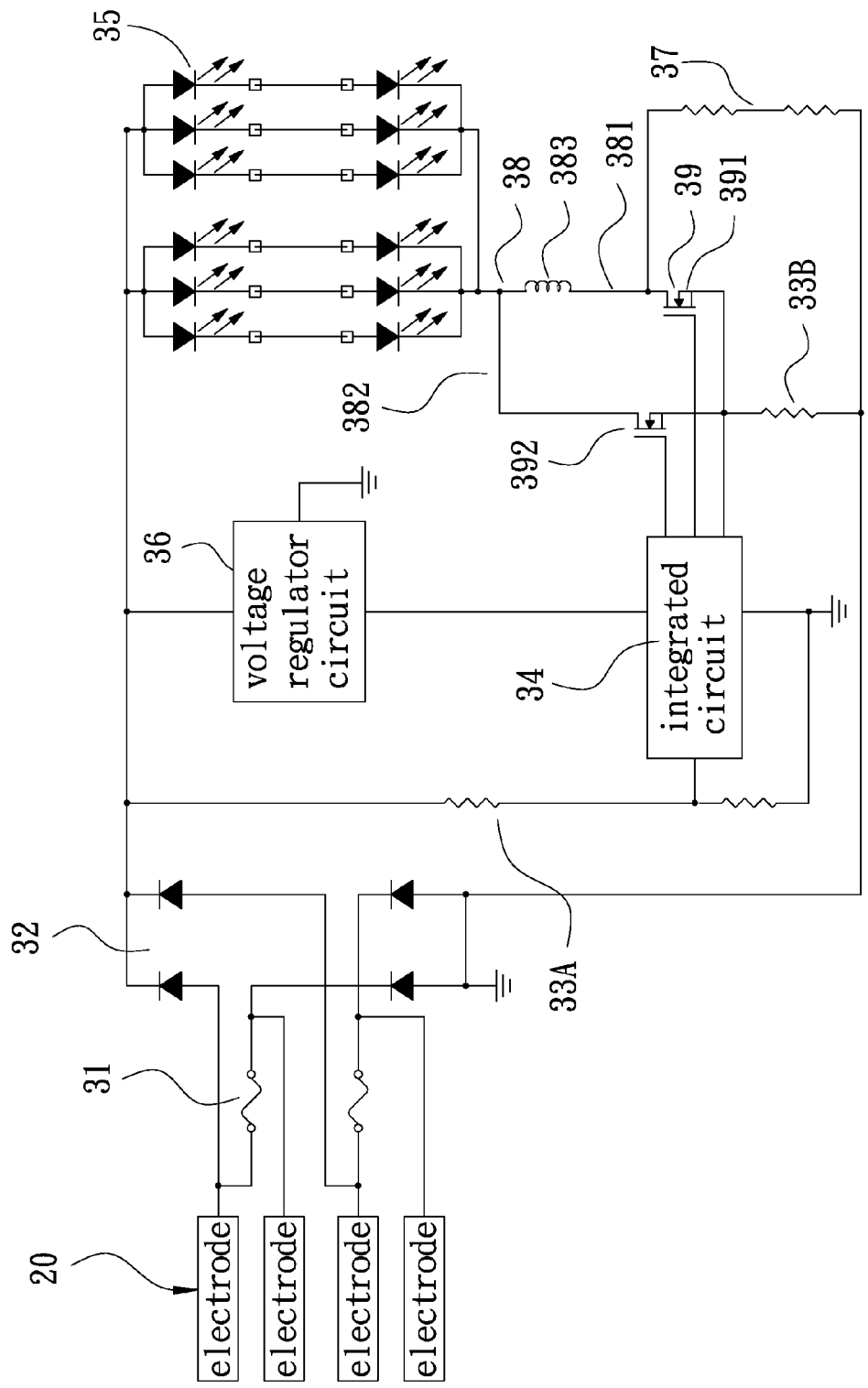
FIG. 5 is a circuit diagram of a preferred embodiment of the invention.
Figure 6:
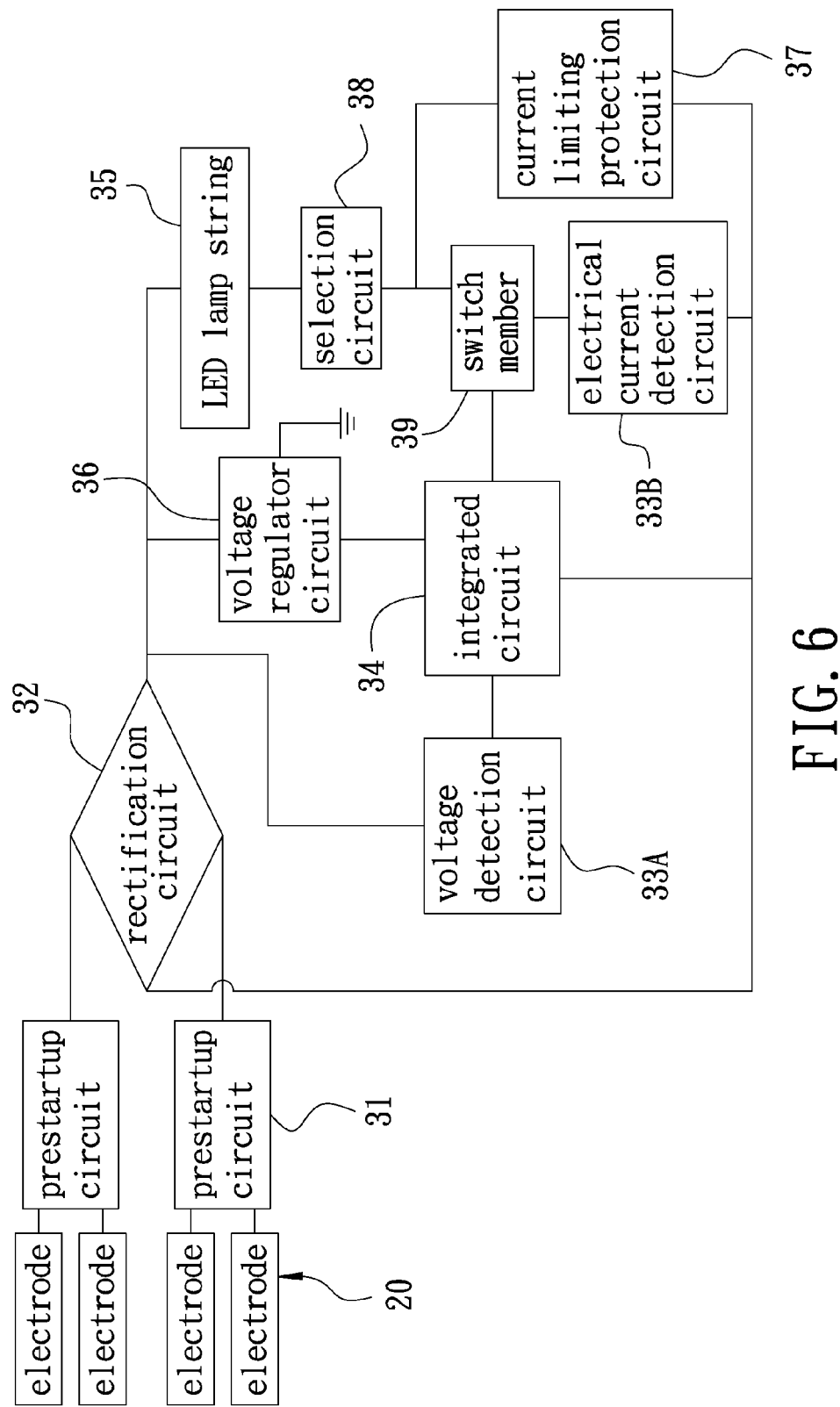
FIG. 6 is a circuit block diagram of a preferred embodiment of the invention.

FIG. 3 is an appearance perspective view of a preferred embodiment of the invention pluggingly connected to a T5/T8 lamp holder, and FIG. 4 is an exploded perspective view of the preferred embodiment of the invention. In FIGS. 3 and 4, an intelligent light emitting diode (LED) lamp tube 100 compatible to a T5/T8 electronic ballast is capable of being pluggingly connected to a lamp holder 200 that is used for T5/T8 lamp tubes. Referring also to FIGS. 5 and 6, the intelligent LED lamp tube 100 compatible to the T5/T8 electronic ballast comprises a tube body 10 having two electrodes 20, a circuit board 30 disposed in the tube body 10 to respectively connect to the two electrodes 20 of the tube body 10 and including two prestartup circuits 31 connected to a rectification circuit 32 that is respectively connected to a voltage detection circuit 33A and an integrated circuit 34, at least one LED lamp string 35 respectively connected to the rectification circuit 32 and the integrated circuit 34, a voltage regulator circuit 36 disposed between the integrated circuit 34 and the LED lamp string 35, and a current limiting protection circuit 37 having a connection in series with the LED lamp string 35 and connected to the rectification circuit 32.

FIG. 5 is a circuit diagram of a preferred embodiment of the invention, and FIG. 6 is a circuit block diagram of the preferred embodiment of the invention. In FIGS. 5 and 6, a selection circuit 38, which is provided with a first end that is connected to the light emitting diode lamp string 35 and a second end that is capable of connecting to a switch member 39 having one end connected to the integrated circuit 34 and is parallelly connected with the current limiting protection circuit 37, comprises at least one first conduction loop 381 and at least one second conduction loop 382.

The first conduction loop 381 is provided with a first end connected to the light emitting diode lamp string 35 and a second end connected to the integrated circuit 34 via the switch member 39, and the second conduction loop 382 configured with an inductor 383 is provided with a first end connected to the light emitting diode lamp string 35 and a second end connected to the integrated circuit 34 via the switch member 39. In this embodiment, the switch member 39 comprises a first electrically-controlled switch 391 serially connected to the first conduction loop 381 of the selection circuit 38 and a second electrically-controlled switch 392 serially connected to the second conduction loop 382 of the selection circuit 38, and the first and second conduction loops 381 and 382 of the selection circuit 38 are connected to the integrated circuit 34 via the switch member 39. Moreover, the switch member 39 further is serially connected with an electrical current detection circuit 33B that is connected to the integrated circuit 34 and the rectification circuit 32. The electrical current detection circuit 33B is an electric resistor, and the first and second electrically-controlled switches of the switch member 39 can be selected from one of a metal oxide semiconductor field effect transistor, a bipolar junction type transistor, a relay or other electrical switching gates. In this embodiment, the first and second electrically-controlled switches of the switch member 39 are metal oxide semiconductor field effect transistors.

Figure 10:
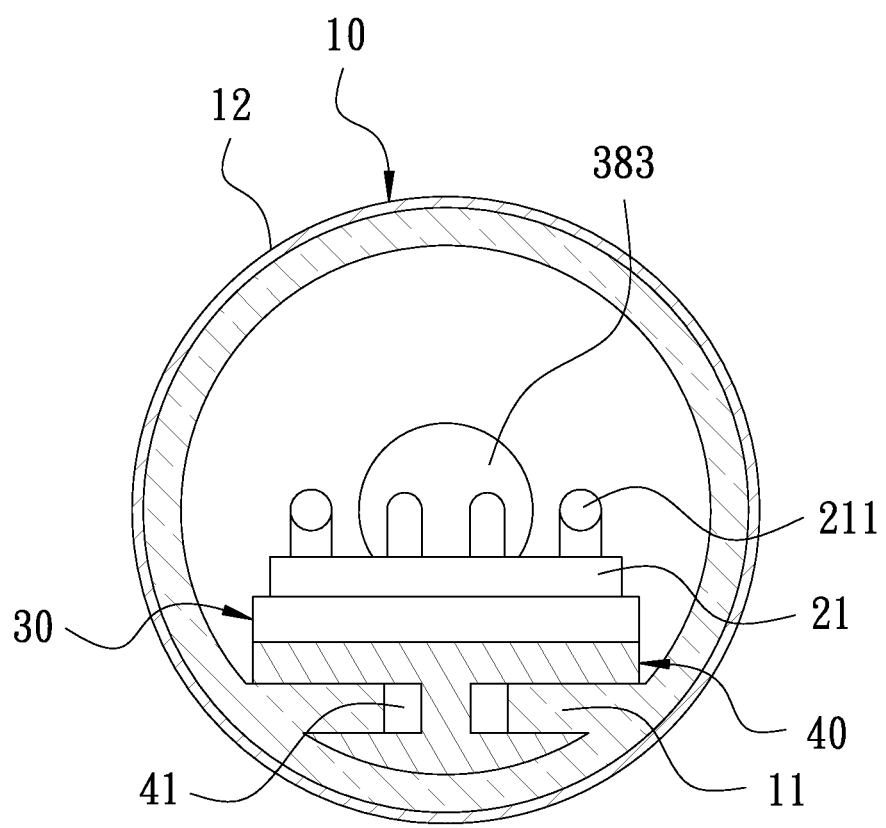
FIG. 10 is a sectional view of a preferred embodiment of the invention.
Figure 11:
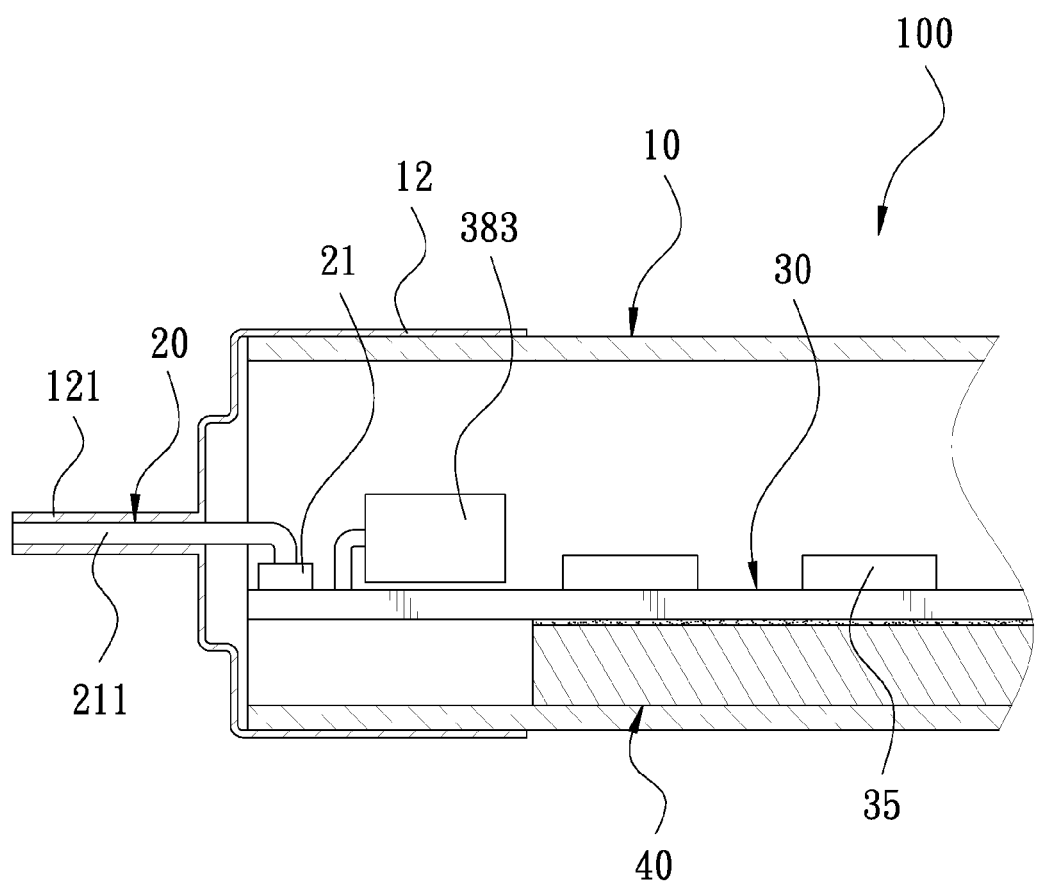
FIG. 11 is a sectional view of a preferred embodiment of the invention.

Referring again to FIG. 4, associated with FIGS. 10 and 11 that are sectional views of the preferred embodiment of the invention, an inner sidewall of the tube body 10 is horizontally, protrudingly configured with relatively-arranged position-limiting convex ribs 11 in an axial direction, an aluminum-extruded type heat-dissipation plate 40 that is configured with two position-limiting slots 41 at two sides of a bottom portion thereof in corresponding to the position-limiting convex ribs 11 is correspondingly, insertedly arranged on the tube body 10, the position-limiting convex ribs 11 are disposed on the position-limiting slots 41 so that the heat-dissipation plate 40 is limited by the tube body 10, and the circuit board 30 is attached on a top surface of the heat-dissipation plate 40. The inductor 383 disposed above the circuit board 30 is located at one end portion of the tube body 10, the electrodes 20 of the tube body 10 are respectively configured with conductive terminals 21 that are located above the two sides of the circuit board 30, two end tube covers 12 of the tube body 10 corresponding to the conductive terminals 21 are utilized to respectively sleeve on two ends of the tube body 10, the inductor 383 is exactly located in the end tube cover 12 of the tube body 10, and the inductor 383 is shielded by the tube cover 12 of the tube body 10. In this embodiment, the conductive terminal 21 comprises two electrode pins 211, the end tube covers 12 of the tube body 10 corresponding to the electrode pins 211 of the conductive terminal 21 comprise two outwardly-protruded conductive tubes 121, the electrode pin 211 of the conductive terminal 21 is correspondingly, insertedly arranged on the conductive tube 121 of the tube body 10, and the conductive tube 121 of the tube body 10 and the electrode pins 211 of the conductive terminal 21 are mutually pressed and fixed.

Figure 7:
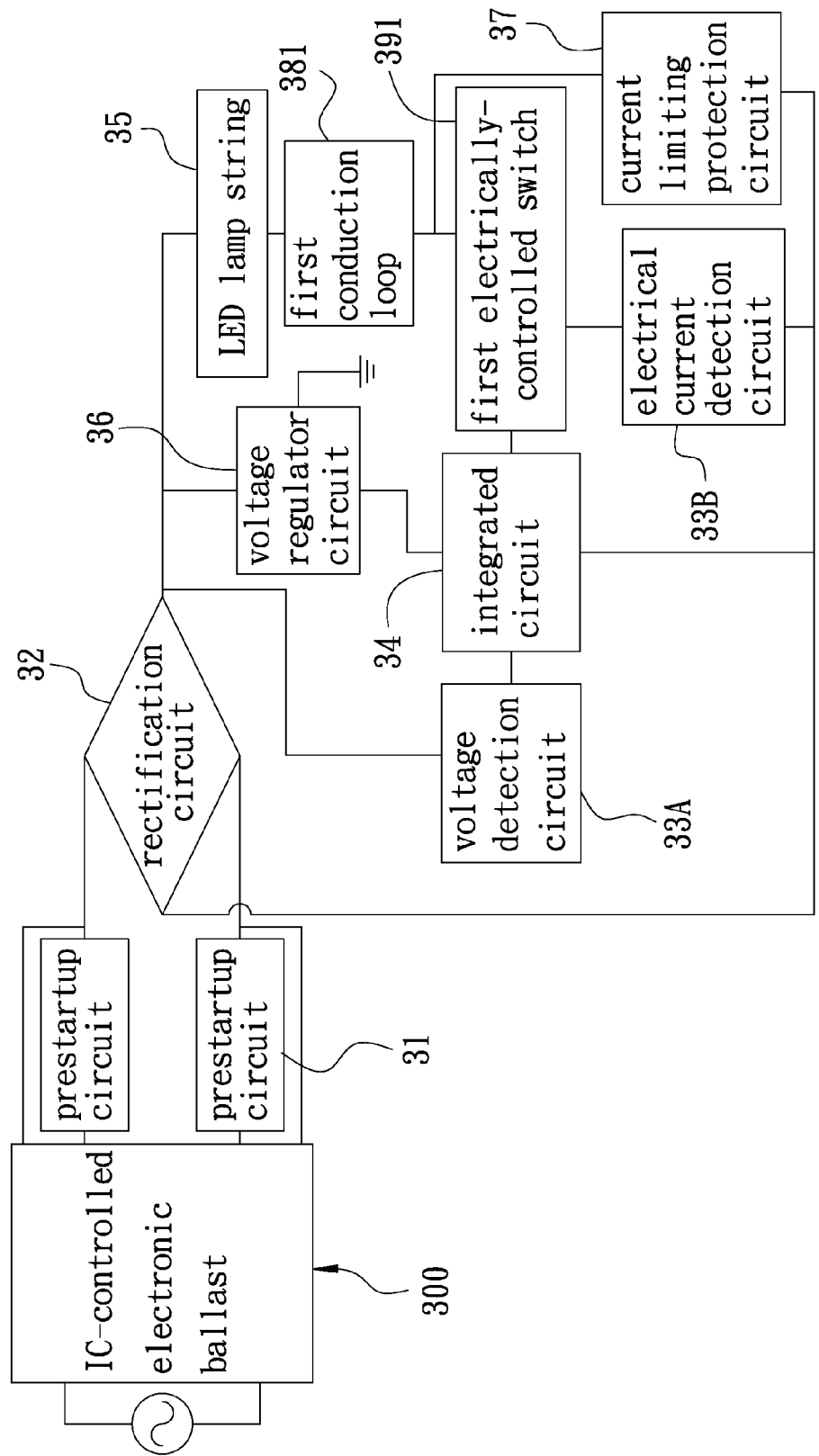
FIG. 7 is a circuit block diagram of a preferred embodiment of the invention connected to an IC-controlled electronic ballast.
Figure 8:
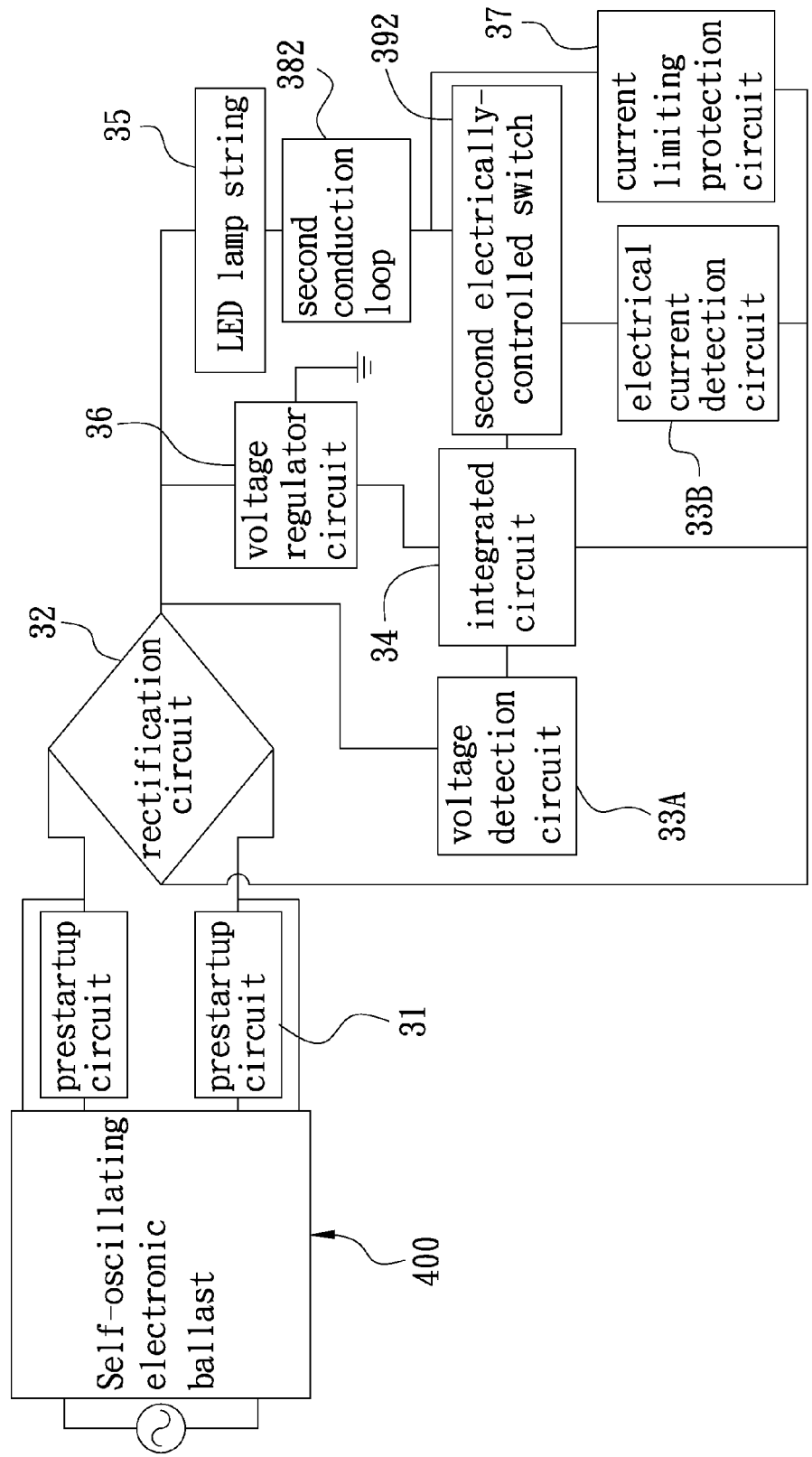
FIG. 8 is a circuit block diagram of a preferred embodiment of the invention connected to a self-oscillating electronic ballast.
Figure 9:
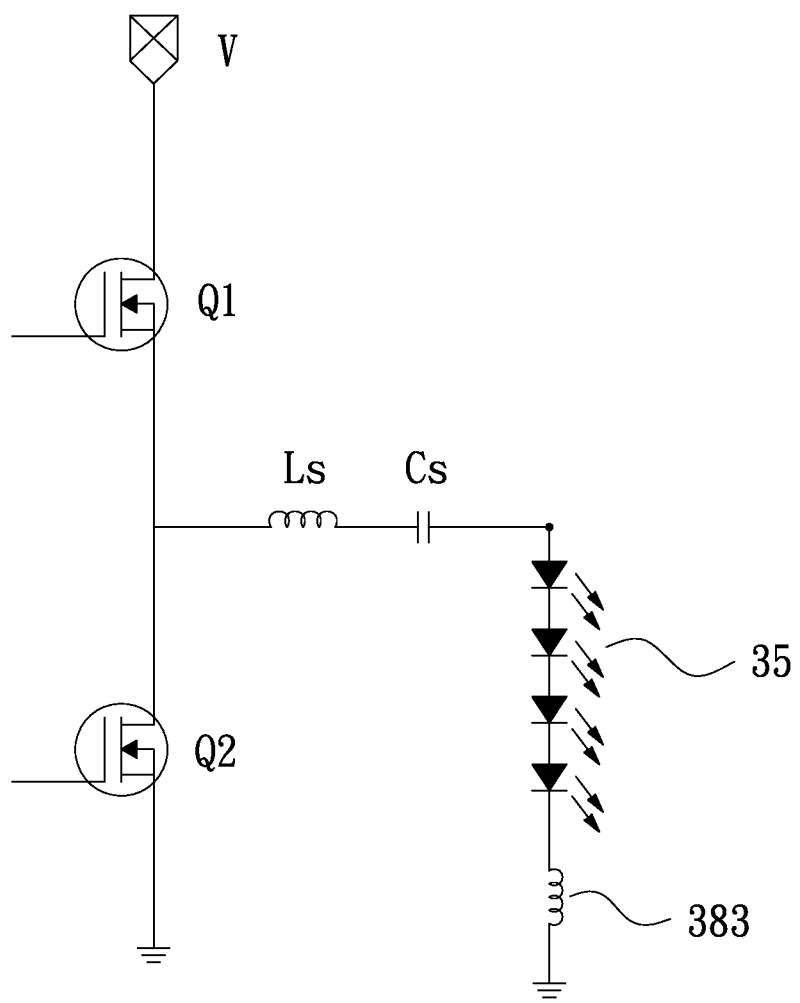
FIG. 9 is an equivalent-circuit diagram of a preferred embodiment of the invention connected to a self-oscillating electronic ballast.

Referring again to FIGS. 3 and 5, the intelligent LED lamp tube 100 is installed on the lamp holder 200 that is used for T5/T8 lamp tubes in use. A transient high voltage is generated from an electronic ballast disposed in the lamp holder 200 when a power switch is activated, and an electrical current generated from the transient high voltage is sequentially traveling the prestartup circuits 31 via the electrodes 20 of the tube body 10, the rectification circuit 32 for converting alternative current into direct current, the LED lamp string 35, the voltage detection circuit 33A, the integrated circuit 34 and the selection circuit 38. The voltage flowing in the integrated circuit 34 can be detected by the voltage detection circuit 33A, allowing the integrated circuit 34 to determine whether the switch member 39 shall be triggered or not. Besides, the electrical current flowing in the LED lamp string 35 can be detected by the electrical current detection circuit 33B, allowing the integrated circuit 34 to determine whether the switch member 39 shall be triggered or not and then determine whether the first electrically-controlled switch 391 or the second electrically-controlled switch 392 shall be utilized. Generally, conventional electronic ballasts are classified into the self-oscillating electronic ballast and the IC-controlled electronic ballast. As shown in FIGS. 5 and 7, when the intelligent LED lamp tube 100 of the invention is conductively connected to the IC-controlled electronic ballast 300, the switch member 39 is triggered by the integrated circuit 34, and a closed path is formed between the first electrically-controlled switch 391 of the switch member 39 and the first conduction loop 381 of the selection circuit 38. Moreover, the integrated circuit (IC) adopted by a self-oscillating electronic ballast 400 is utilized to adjust the current condition of the circuit board 30, providing effects of high power factor, low harmonic distortion, high efficiency and low power consumption. As shown in FIGS. 5 and 8, when the intelligent LED lamp tube 100 of the invention is conductively connected to a self-oscillating electronic ballast 400, the switch member 39 is triggered by the circuit board 30 via the integrated circuit 34, so that the second electrically-controlled switch 392 is communicated with the second conduction loop 382 that is serially connected to the inductor 383. Besides, in accordance with the connection of an expression of the self-oscillating electronic ballast 400, $$L_s = \frac{V * V_{lamp}}{2.4 * P_{lamp} * 2\pi f_s},$$

which is suitable for the above-described measure, and the equivalent-circuit diagram in FIG. 9, it can prove that the induction value is inversely proportional to the power consumption. With the second conduction loop 382 serially connected to the inductor 383 and further using the inductor 383 to increase the inductor value in the loop of the circuit board 30, power consumptions of the LED lamp string 35 and other internal electronic components can be effectively reduced, average electrical current and resonance frequency can be changed, and amplitude and frequency of the resonance can be reduced, so that an effects of reducing power consumption in reduced power can be attained. When the intelligent LED lamp tube 100 compatible to the T5/T8 electronic ballast is connected to a self-oscillating electronic ballast or an IC-controlled electronic ballast, the selection circuit 38 and the switch member 39 can be triggered by the integrated circuit 34, so that the electronic current is allowed to travel the first conduction loop 381 or the second conduction loop 382 configured with an inductor 383. Accordingly, with the invention capable of completely activating the intelligent LED lamp tube 100 and reducing light-up time and changing resonance frequency, effects of reducing power consumption and energy conservation can be attained, and advantages of applicable to different electronic ballasts and preferred adaptiveness can be achieved.

Referring also to FIGS. 4 and 10, with the inner sidewall of the tube body 10 to be configured with position-limiting convex ribs 11 in the axial direction, the heat-dissipation plate 40 is allowed to correspondingly, insertedly arranged on the tube body 10, and the position-limiting convex ribs 11 are allowed to be disposed on the position-limiting slots 41, so that the heat-dissipation plate 40 can be limited by the tube body 10. Referring also to FIG. 8, with the circuit board 30 to be attached on the top surface of the heat-dissipation plate 40 and the heat-dissipation plate 40 being an aluminum-extruded type metal member, heat generated from the circuit board 30 can be transferred to the heat-dissipation plate 40 for dissipation. Accordingly, with the preferred heat transfer property of the heat-dissipation plate 40 capable of being stably disposed in the tube body 10 by the position-limiting convex ribs 11 and the position-limiting slots 41, illumination efficiency of the LED lamp string 35 does not affected, and an advantage of extending service life of the circuit board 30 can be achieved.

Referring again to FIG. 11, with the electrode pin 211 of the conductive terminal 21 to be correspondingly, insertedly arranged on the conductive tube 121 of the end tube cover 12 and the end tube covers 12 to be coveringly arranged on both ends of the tube body 10 for shielding the inductor 383, the conductive tube 121 of the tube body 10 and the electrode pins 211 of the conductive terminal 21 is allowed to be mutually pressed and fixed. Accordingly, advantages of increasing production efficiency, reducing manufacturing costs, and providing preferred structural strength can be achieved.

What is claimed is:

1. An intelligent light emitting diode lamp tube compatible to a T5/T8 electronic ballast, comprising a tube body having two electrodes, a circuit board disposed in the tube body to respectively connect to the two electrodes of the tube body and including two prestartup circuits connected to a rectification circuit that is connected to an integrated circuit, and at least one light emitting diode lamp string respectively connected to the rectification circuit and the integrated circuit, characterized in that a selection circuit provided with a first end that is connected to the light emitting diode lamp string and a second end that is capable of connecting to a switch member having one end connected to the integrated circuit comprises at least one first conduction loop and at least one second conduction loop, in which the first conduction loop is provided with a first end connected to the light emitting diode lamp string and a second end connected to the integrated circuit via the switch member, and the second conduction loop configured with an inductor is provided with a first end connected to the light emitting diode lamp string and a second end connected to the integrated circuit via the switch member, so that the intelligent light emitting diode lamp tube compatible to the T5/T8 electronic ballast is able to conduct the selection circuit and the switch member via the integrated circuit in accordance with voltage and current signal and internal operation when being connected to a self-oscillating electronic ballast or an IC-controlled electronic ballast, allowing the current to flow past the first conduction loop or the second conduction loop to thus attain efficacies of changing resonant frequency and reducing power consumption.

2. The intelligent light emitting diode lamp tube compatible to the T5/T8 electronic ballast as claimed in claim 1, wherein the switch member comprises a first electrically-controlled switch serially connected to the first conduction loop of the selection circuit and a second electrically-controlled switch serially connected to the second conduction loop of the selection circuit, and the first and second conduction loops of the selection circuit are connected to the integrated circuit via the switch member.

3. The intelligent light emitting diode lamp tube compatible to the T5/T8 electronic ballast as claimed in claim 2, wherein the first and second electrically-controlled switches of the switch member are selected from one of a metal oxide semiconductor field effect transistor, a bipolar junction type transistor, a relay or other electrical switching gates.

4. The intelligent light emitting diode lamp tube compatible to the T5/T8 electronic ballast as claimed in claim 1, wherein the inductor disposed above the circuit board is located at one end portion of the tube body, the electrodes of the tube body are respectively configured with conductive terminals that are located above the two sides of the circuit board, two end tube covers of the tube body corresponding to the conductive terminals are utilized to respectively sleeve on two ends of the tube body, the inductor is exactly located in the end tube cover of the tube body, and the inductor is shielded by the tube cover of the tube body.

5. The intelligent light emitting diode lamp tube compatible to the T5/T8 electronic ballast as claimed in claim 4, wherein the conductive terminal comprises two electrode pins, the end tube covers of the tube body corresponding to the electrode pins of the conductive terminal comprise two outwardly-protruded conductive tubes, the electrode pin of the conductive terminal is correspondingly, insertedly arranged on the conductive tube of the tube body, and the conductive tube of the tube body and the electrode pins of the conductive terminal are mutually pressed and fixed.

6. The intelligent light emitting diode lamp tube compatible to the T5/T8 electronic ballast as claimed in claim 1, wherein an inner sidewall of the tube body is horizontally, protrudingly configured with relatively-arranged position-limiting convex ribs in an axial direction, an aluminum-extruded type heat-dissipation plate that is configured with two position-limiting slots at two sides of a bottom portion thereof in corresponding to the position-limiting convex ribs is correspondingly, insertedly arranged on the tube body, the position-limiting convex ribs are disposed on the position-limiting slots so that the heat-dissipation plate is limited by the tube body, and the circuit board is attached on a top surface of the heat-dissipation plate.

* * * * *